United States Patent
Sodan et al.

(10) Patent No.: US 11,841,283 B2
(45) Date of Patent: Dec. 12, 2023

(54) PRESSURE SENSOR WITH IMPROVED DIAPHRAGM SEAL

(71) Applicant: Robert Bosch GmbH, Stuttgart (DE)

(72) Inventors: Lars Sodan, Balingen (DE); Dorothee Nonnenmacher, Leinfelden-Echterdingen (DE); Elmar Kroner, Tamm (DE); Friedhelm Guenter, Burgstetten (DE); Joachim Friedl, Reutlingen (DE); Joachin Kreutzer, Reutlingen (DE); Klaus-Volker Schuett, Wernau (DE); Michael Raedler, Hamburg (DE); Patrick Stihler, Schlaitdorf (DE); Raschid Baraki, Reutlingen (DE); Steven Maul, Leonberg (DE); Yang Zou, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/454,710

(22) Filed: Nov. 12, 2021

(65) Prior Publication Data

US 2022/0155171 A1    May 19, 2022

(30) Foreign Application Priority Data

Nov. 17, 2020    (DE) ..................... 10 2020 214 384.6

(51) Int. Cl.
  *G01L 19/06*    (2006.01)
  *G01L 9/00*    (2006.01)

(52) U.S. Cl.
  CPC ........ *G01L 19/0627* (2013.01); *G01L 9/0041* (2013.01)

(58) Field of Classification Search
  None
  See application file for complete search history.

(56) References Cited

U.S. PATENT DOCUMENTS

| | | | |
|---|---|---|---|
| 5,218,972 A * | 6/1993 | Gorsuch | A61B 5/033 600/588 |
| 5,661,245 A * | 8/1997 | Svoboda | A61M 5/16854 73/726 |
| 2016/0238477 A1* | 8/2016 | Lemery | G01L 9/0042 |

FOREIGN PATENT DOCUMENTS

| | | |
|---|---|---|
| DE | 102011102837 A1 | 12/2012 |
| DE | 102014222853 A1 | 5/2016 |

* cited by examiner

*Primary Examiner* — Brandi N Hopkins
*Assistant Examiner* — Nigel H Plumb
(74) *Attorney, Agent, or Firm* — NORTON ROSE FULBRIGHT US LLP; Gerard Messina

(57) ABSTRACT

A method for manufacturing a sensor. The sensor includes a sensing element and a housing, the housing including an interior space, which is accessible through a housing opening, and the sensing element being situated in the interior space and being designed to detect a property and/or a composition of an ambient medium of the sensor. The method includes filling the interior space with a protective medium through the housing opening, the protective medium being designed to transfer the property and/or the composition of the ambient medium to the sensing element; fixing a preferably flexible diaphragm at or in the housing opening preferably for sealing the housing opening, the diaphragm including at least one diaphragm opening; and sealing the at least one diaphragm opening. A sensor, which is manufactured according to this method, is also described.

13 Claims, 3 Drawing Sheets

PRESSURE SENSOR WITH IMPROVED DIAPHRAGM SEAL

CROSS REFERENCE

The present application claims the benefit under 35 U.S.C. § 119 of German Patent Application No. DE 102020214384.6 filed on Nov. 17, 2020, which is expressly incorporated herein by reference in its entirety.

FIELD

The present invention relates to a method for manufacturing a sensor, the sensor including a sensing element and a housing, the housing including an interior space, which is accessible through a housing opening, and the sensing element being situated in the interior space, and being designed to detect a property and/or a composition of an ambient medium of the sensor.

The present invention further relates to a sensor.

BACKGROUND INFORMATION

Although the present invention is applicable in general to arbitrary sensors, with which it is possible to detect a property and/or a composition of an ambient medium, the present invention is explained with respect to pressure sensors.

Pressure sensors have been introduced on a broad scale in consumer electronic devices such as, for example, smartphones and smartwatches. Driven by new applications such as, for example, indoor navigation or tracking of fitness exercises, the demands placed on the measuring accuracy of pressure sensors continue to increase. At the same time, new device generations are designed to be media-tight and dirt-repellant, so that high-precision and media-tight pressure sensors are called for. It is equally necessary that over the course of the service life the pressure sensors become contaminated as little as possible in order to ensure a trouble-free functionality. The surfaces of the sensor exposed to an ambient medium necessary for the sensor system should therefore exhibit a preferably minimal tendency to become contaminated.

To achieve high-precision and yet readily miniaturizable sensors, it is conventional to design the sensing element of the sensor as a MEMS (micro-electro-mechanical system). To achieve a media-tight sensor, the sensing element may be embedded into a protective medium and be thereby protected against a direct contact with an ambient medium. Conventional protective media are formed by gels or oils. The protective medium has the additional task of conducting a property and/or a composition of the ambient medium to the sensing element and of enabling a detection of the property and/or the composition by the sensing element. It is conventional to protect the surface of the protective medium, which is in contact with the ambient medium, with a diaphragm. In the case of a fluid as the protective medium, this diaphragm also prevents a leakage of the protective medium.

When using a diaphragm, it should be ensured that preferably no air pockets remain between the protective medium and the diaphragm. According to one conventional approach, the sensor housing includes a filler opening and a suction opening. The interior space is filled with the protective medium through the filler opening and excess air is suctioned out through the suction opening. Once the interior space is filled with the protective medium, the filler opening and the suction opening are sealed, for example, by a plug. The disadvantage here is that the manufacture of the sensor housing becomes complex as a result of the additional openings.

SUMMARY

In one specific embodiment, the present invention provides a method for manufacturing a sensor, the sensor includes a sensing element and a housing, the housing including an interior space, which is accessible through a housing opening, and the sensing element being situated in the interior space and being designed to detect a property and/or a composition of an ambient medium of the sensor, including:
  filling the interior space with a protective medium through the housing opening, the protective medium being designed to transfer the property and/or the composition of the ambient medium to the sensing element,
  fixing a preferably flexible diaphragm at or in the housing opening preferably for sealing the housing opening, the diaphragm including at least one diaphragm opening, and
  sealing the at least one diaphragm opening.

In one further specific embodiment, the present invention provides a sensor, preferably a pressure sensor, manufactured using a method according to the aforementioned specific embodiment.

Prior to the filling with a protective medium, the fixing of a diaphragm and the sealing of the at least one diaphragm opening, a sensor is provided as a type of "sensor blank." This sensor includes a housing, which includes an interior space and a housing opening. A sensing element is situated in the interior space. The housing opening enables an access to the interior space. On the one hand, this means that a property and/or a composition of an ambient medium is able to reach—directly or indirectly—the sensing element from outside the sensor through the opening. On the other hand, the access enables the interior space to be filled with the protective medium.

With respect to a sequence of filling with the protective medium and of fixing the diaphragm, it is noted that in one specific embodiment the filling with the protective medium may take place prior to the fixing of the diaphragm. This allows for a particularly good access for filling with the protective medium. In another specific embodiment, the fixing of the diaphragm takes place prior to the filling with the protective medium. In this case, the at least one diaphragm opening may be utilized for filling with the protective medium.

The diaphragm may be formed from different materials. In one specific embodiment, the diaphragm is formed from a metal. In another specific embodiment, the diaphragm is formed from a plastic material. In the case of a pressure sensor, in particular, it is useful if the diaphragm is as flexible as possible. In this case, the diaphragm may include a small E-module, may be thin—for example, one to a few ten micrometers thick—and/or may be structured—for example, with an undulating profile.

The "at least one diaphragm opening" is already present at the diaphragm. This may mean that the diaphragm opening(s) is/are generated already during the manufacture of the diaphragm. The number of diaphragm openings may be a function of the respective specific application. A single diaphragm opening may be useful if the protective medium is filled through the diaphragm opening with the aid of a cannula. Two diaphragm openings may be useful if the protective medium is filled through a diaphragm opening with the aid of a cannula, while gas, for example air, is drawn from the interior space through another diaphragm opening. A plurality of diaphragm openings may be useful if the sensor is degassed prior to sealing, for example, by application of a negative pressure. On the whole, the number of diaphragm openings may thus be a function of the respective application and/or may be utilized for a variety of purposes.

The diaphragm opening(s) itself/themselves may be differently shaped, as long as the diaphragm opening is able to fulfill a function in terms of the present description. The boundary of the diaphragm opening(s) may, in principle, be arbitrarily formed. In one specific embodiment, the diagraph opening(s) have a continuous boundary. Such diaphragm openings may, for example, have a round or elliptical shape. In this way, the stability of the diaphragm is minimally affected.

A "fixing of a diaphragm at or in the housing opening" may take place in various ways. In this case, a fixing area may be formed at or in the housing opening. How the fixing area is designed is a function, in particular, of the type of fixing and of the positioning of the fixing area relative to the housing opening.

The diaphragm may be welded to, or be otherwise materially integrated with, the fixing area and/or may be clamped at the fixing area or held in some other mechanical manner. In this case, it may be useful if after the fixing, a media-tight connection is formed between the diaphragm and the housing opening.

The "sealing of the at least one diaphragm opening" may take place in various ways. In this case, the diaphragm opening is sealed preferably in such a way that the protective medium is no longer able to exit the interior space. A sealed diaphragm opening in this case may be designed to be air-tight and/or liquid-tight—or generally media-tight. Moreover, a diaphragm opening sealed by a filling may be just as stable, or even more stable, than a full-surface diaphragm without a diaphragm opening or without diaphragm openings. Which material is used for the sealing, may be a function, in particular, of the material of the diaphragm. The specific process steps of the sealing will be a function of the material of the filling used for sealing the at least one diaphragm opening. In this case, a filling of the diaphragm opening may be thin. In one specific embodiment, the filling is between 5 micrometers and 50 micrometers, for example, 10 micrometers or 20 micrometers in thickness.

The "sensing element" may be implemented in various ways, as long as it is able to detect a property and/or a composition of an ambient medium. Such properties and/or compositions may, for example, be a pressure, a temperature, a gas content, for example, carbon dioxide or carbon monoxide, and/or a moisture, to name just some conceivable specific embodiments. The sensing element may be correspondingly diverse, the sensor also capable of including multiple, also different sensing elements. The sensing element may be designed as a MEMS (micro-electro-mechanical system), as a result of which a particularly compact sensor may be implemented.

Further features, advantages and further specific embodiments of the present invention are described below and thereby become apparent.

In one specific embodiment of the present invention, a degassing of the protective medium is carried out prior to the sealing of the at least one diaphragm opening, the degassing of the protective medium taking place preferably by application of a negative pressure to the at least one diaphragm opening. In this way, gas bubbles, which may form when the interior space is filled with the protective medium, may be removed from the protective medium.

In one specific embodiment of the present invention, the sealing of the at least one diaphragm opening is carried out by dispensing a preferably liquid monomer onto the diaphragm in the area of the at least one diaphragm opening and by subsequently curing the monomer to form a polymer. In one specific embodiment, the dispensing or the delivery of the monomer takes place with the aid of a cannula. In another specific embodiment, the dispensing takes place with the aid of a spray coating, as a result of which even thinner and more homogenous layers are formable. The curing may take place by irradiation, for example, with ultraviolet light. On the whole, thin and simultaneously stable fillings may be generated in this manner.

In one specific embodiment of the present invention, the sealing of the at least one diaphragm opening is carried out by dispensing a preferably liquid polymer onto the diaphragm in the area of the at least one diaphragm opening and by subsequently curing the polymer. In the process, different polymers may be used, for example, also a standard polymer adhesive. By utilizing a polymer for sealing the at least one diaphragm opening, it is possible to resort to methods that are common in a semiconductor assembly. This simplifies the manufacture of the sensor.

In one specific embodiment of the present invention, the sealing of the at least one diaphragm opening takes place in the presence of excess protective medium present at the at least one diaphragm opening. In this way, it is not necessary to ensure that the diaphragm and/or the diaphragm opening is/are free of excess protective medium. This may facilitate the manufacturing process.

In one specific embodiment of the present invention, excess protective medium present at the diaphragm is removed before the at least one diaphragm opening is sealed. In this way, a good adhesion of a sealing material and/or a wide range of usable sealing materials may be achieved.

In one specific embodiment of the present invention, the diaphragm is fixed at an intermediate carrier and in fixing the diaphragm at or in the housing opening, the intermediate carrier is fixed at or in the housing opening. Such an intermediate carrier—also referred to as an interposer—may simplify the manufacture of the sensor or the fixing of the diaphragm at or in the housing opening. For this purpose, the diaphragm is connected to the intermediate carrier in an upstream manufacturing step. The intermediate carrier together with the diaphragm may then be inserted into the housing opening or fixed at the housing opening. The manufacturing steps are thus parallelizable.

In one specific embodiment of the present invention, the housing and the intermediate carrier and/or the intermediate carrier and the diaphragm are fixed next to one another with the aid of a clip connection and/or with the aid of pressfitting. In this way, a stable and/or media-tight fixing of the diaphragm in or at the housing opening may be implemented in a particularly simple manner.

In one specific embodiment of the present invention, the housing and the intermediate carrier are fixed to one another with the aid of a materially-integrated bonding process, preferably with the aid of welding. In this way, a particularly high media impermeability and/or particularly stable connections may be achieved.

In one specific embodiment of the present invention, the at least one diaphragm opening has a dimension of a few millimeters or less, preferably smaller than or equal to 1 millimeter, particularly preferably of less than or equal to 0.5 millimeters, the at least one diaphragm opening having a dimension of more than 10 micrometers, preferably greater than or equal to 100 micrometers. A size of the diaphragm openings of a few millimeters or smaller allows for a diaphragm opening that is sufficiently large and yet influences barely or at most minimally the stability of the diaphragm. A size of the diaphragm opening(s) of less than or equal to 0.5 millimeters influences the diaphragm less, so that the manufacturing process up to the sealing of the diaphragm opening may be simplified. Such a small diaphragm opening is useful, in particular, when using multiple diaphragm openings. A size of the diaphragm opening(s) of more than 10 micrometers allows for a reliable handling in the manufacturing process. At a size of greater than or equal to 100 micrometers, a potential plugging of the diaphragm opening(s) may be avoided, depending on the protective medium used.

In one specific embodiment of the present invention, the protective medium is formed by a non-compressible fluid, preferably, an oil. In this way a protective medium may be provided in a simple manner.

Further features and advantages of the present invention result from the figures and from the associated figure description with reference to the figures. It is understood that the features mentioned above and those still to be explained below are usable not only in the respectively indicated combination, but also in other combinations or alone, without departing from the scope of the present invention.

Preferred embodiments and specific embodiments of the present invention are represented in the figures and are explained in greater detail in the following description, identical reference numerals referring to identical or similar or functionally identical components or elements.

DETAILED DESCRIPTION OF EXAMPLE EMBODIMENTS

FIGS. 1 through 5 show various views of one specific example embodiment of a sensor, which has been manufactured by a method according to the present invention.

Figure 1:
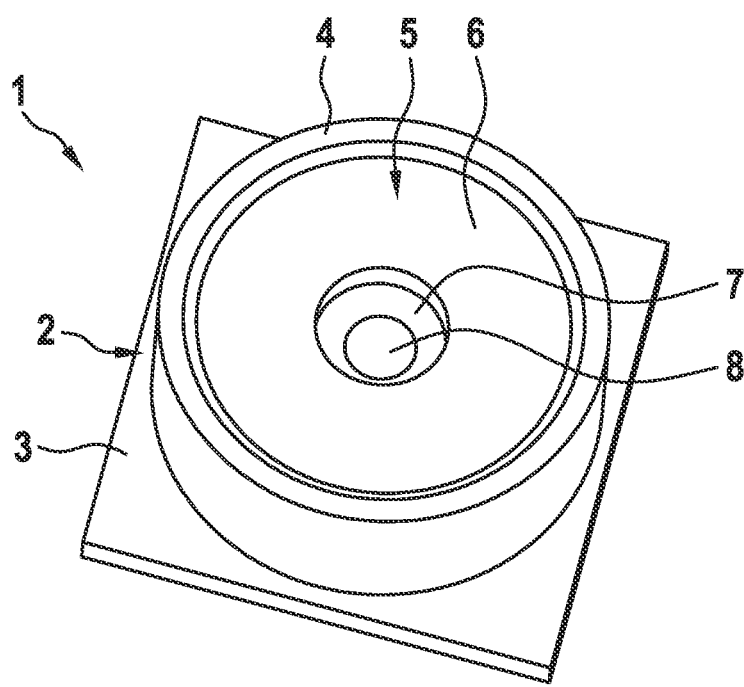
FIG. 1 shows an oblique view of one specific embodiment of a sensor according to the present invention.

FIG. 1 shows an oblique view of sensor 1. A housing 2 of sensor 1 is formed by a rewiring substrate 3 and a sleeve 4. A housing opening 5 is formed in the upper area, into which an intermediate carrier 6—also referred to as an interposer—is press-fitted. Intermediate carrier 6 includes an intermediate carrier opening 7, through which a filling 8 is apparent.

Figure 2:
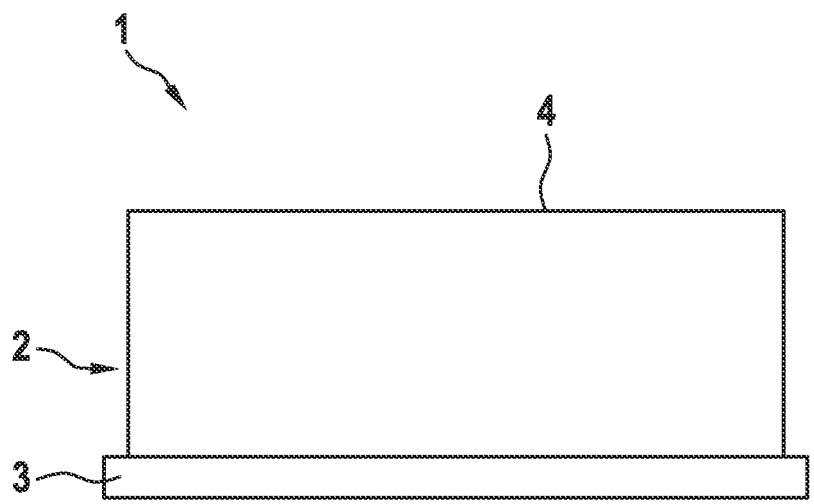
FIG. 2 shows a side view of the sensor according to FIG. 1.

FIG. 2 shows a side view of sensor 1 including rewiring substrate 3 and sleeve 4.

Figure 3:
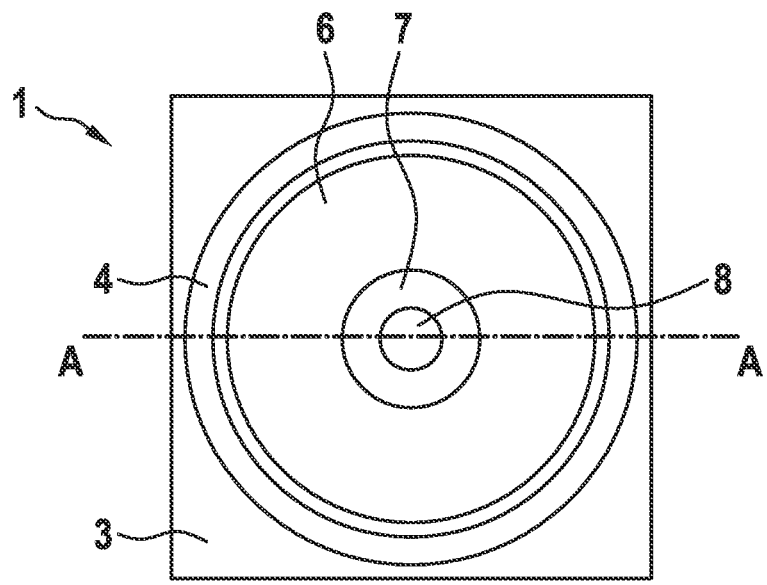
FIG. 3 shows a top view of the sensor according to FIG. 1.

FIG. 3 shows a top view of sensor 1 including rewiring substrate 3, sleeve 4, intermediate carrier 6 and filling 8.

Figure 4:
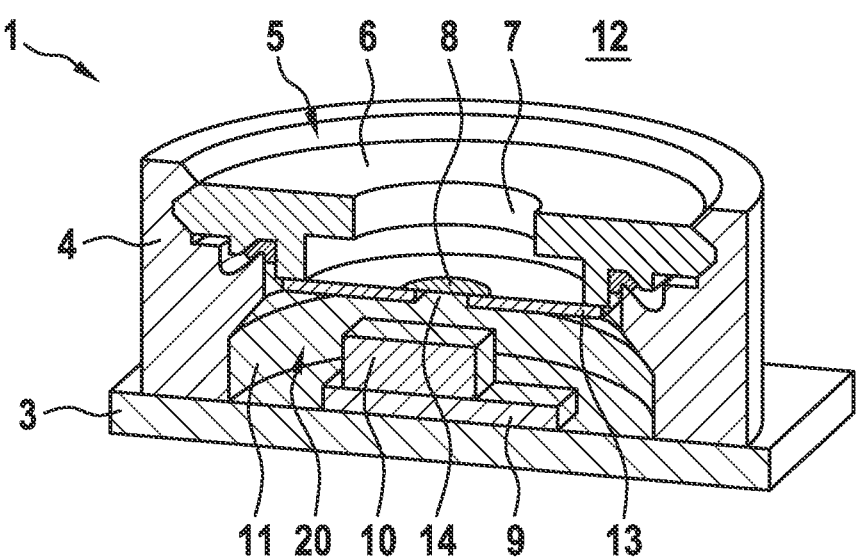
FIG. 4 shows an oblique view of a section through the sensor according to FIG. 3 along line A-A.

FIG. 4 shows an oblique view of a section through sensor 1. An ASIC (application-specific integrated circuit) 9 is situated on rewiring substrate 3 and a sensing element 10 is situated on ASIC 9. Sensing element 10 in this case is situated in an interior space 20, which is formed in housing 2. Interior space 20 is filled at least partially by a protective medium 11 which, on the one hand, shields sensing element 10 from an ambient medium 12 and, on the other hand, transfers a property and/or a composition of the ambient medium to sensing element 10, for example, the pressure in ambient medium 12. Intermediate carrier 6, at the underside of which a diaphragm 13 is situated, is situated in housing opening 5. Diaphragm 13 includes a diaphragm opening 14, which has been sealed by a filling 8. The intermediate carrier is press-fitted into sleeve 4, as a result of which diaphragm 13 is fixed in housing opening 5.

Figure 5:
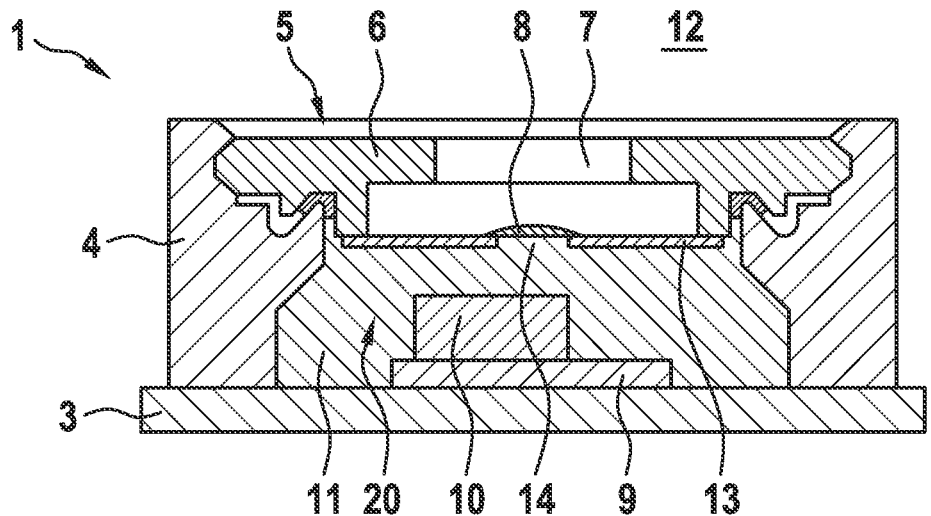
FIG. 5 shows a side view of a section through the sensor according to FIG. 3 along line A-A.

These elements are apparent once again in FIG. 5 from a somewhat different view angle.

Figure 6:
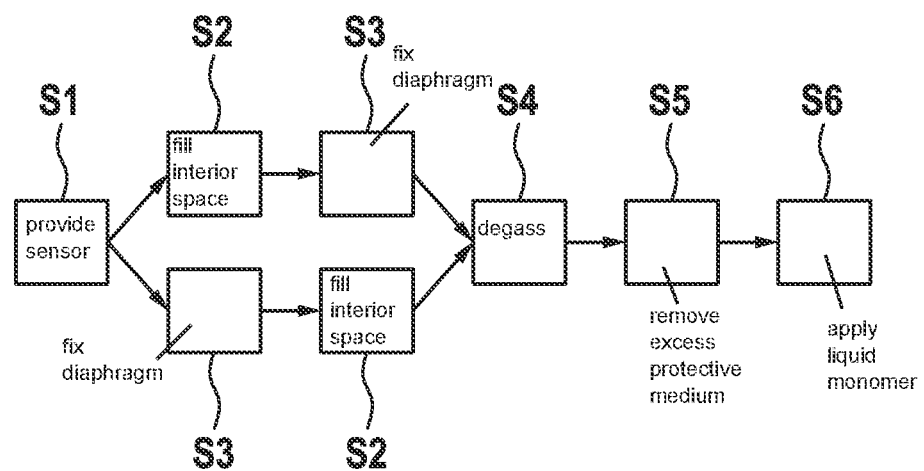
FIG. 6 shows a flowchart of one specific embodiment of a method according to the present invention.

FIG. 6 shows a flowchart of one specific embodiment of a method according to the present description. In step S1, a sensor 1 is provided, which includes a sensing element 10 and a housing 2, an interior space 20 being formed in housing 2, which is accessible through a housing opening 5, and in which sensing element 10 is situated. Proceeding from step S1, two alternatives are represented. In a first alternative, interior space 20 is initially filled in step S2 with a protective medium 11, and subsequently in step S3, a diaphragm 13 is fixed at or in housing opening 5. In a second alternative, diaphragm 13 is initially fixed in step S3 and subsequently in step S2 interior space 20 is filled with protective medium 11—for example through diaphragm opening 14. The filling of interior space 20 with protective medium 11 may take place under atmospheric pressure. The diaphragm may be fixed by press-fitting the intermediate carrier into sleeve 4 (with an optional materially-integrated bond) or by inserting intermediate carrier 6 and subsequent materially-integrated bonding. The materially-integrated bonding in this case may take place by way of a welding process.

In an optional step S4, a degassing of protective medium 11 is carried out, for example, by application of a negative pressure to the sensor. In a further optional step S5, excess protective medium 11 located in the area of diaphragm opening 14, in particular, on the upper side of diaphragm 13, is removed. In this way, a contact surface for a filling 8 for sealing diaphragm opening 14 may be prepared. This excess protective medium 11 may be formed during both aforementioned sequences of steps S2 and S3. In step S6, the diaphragm opening is sealed by a filling 8. In this step S6, a liquid monomer may be applied in the area of the diaphragm opening and subsequently cross-linked to form a polymer, for example, by irradiation using ultraviolet light.

Although the present invention has been described based on preferred exemplary embodiments, it is not restricted thereto, but is modifiable in a variety of ways.

What is claimed is:

1. A sensor, comprising:
   a sensing element; and
   a housing, the housing including an interior space which is accessible through a housing opening, and the sensing element being situated in the interior space and being configured to detect a property and/or a composition of an ambient medium of the sensor;
   wherein the interior space is filled with a protective medium through the housing opening, the protective medium being configured to transfer the property and/or the composition of the ambient medium to the sensing element, a diaphragm is fixed at or in the housing opening, the diaphragm including at least one diaphragm opening, and the at least one diaphragm opening is sealed with a material different from the protective medium.

2. The sensor as recited in claim 1, wherein the sensor is a pressure sensor.

3. The sensor as recited in claim 1, wherein the at least one diaphragm opening has a dimension smaller than or equal to 1 millimeter, and the at least one diaphragm opening has a dimension of greater than or equal to 100 micrometers.

4. The sensor as recited in claim 1, wherein the protective medium is a non-compressible fluid.

5. The sensor as recited in claim 4, wherein the non-compressible fluid is an oil.

6. The sensor as recited in claim 1, wherein the diaphragm is flexible and seals the housing opening.

7. The sensor as recited in claim 1, wherein the protective medium is a degassed medium, having been degassed prior to the sealing of the at least one diaphragm opening.

8. The sensor as recited in claim 7, wherein the degassing of the protective medium takes place by application of a negative pressure to the at least one diaphragm opening.

9. The sensor as recited in claim 1, further comprising a seal with which the at least one diaphragm opening is sealed, the seal being formed of a polymer of a cured liquid monomer situated on the diaphragm in an area of the at least one diaphragm opening.

10. The sensor as recited in claim 1, further comprising a seal with which the at least one diaphragm opening is sealed, the seal being formed of a cured liquid polymer situated on the diaphragm in an area of the at least one diaphragm opening.

11. The sensor as recited in claim 1, wherein the diaphragm is fixed at an intermediate carrier and in fixing the diaphragm at or in the housing opening, the intermediate carrier is fixed at or in the housing opening.

12. The sensor as recited in claim 11, wherein the housing and the intermediate carrier and/or the intermediate carrier and the diaphragm are fixed to one another with a clip connection and/or are press-fit to one another.

13. The sensor as recited in claim 11, wherein the housing and intermediate carrier are welded to one another via a materially-integrated bonding.

\* \* \* \* \*